(No Model.)
E. N. FOOTE.
METALLIC BUTTON SHANK.
No. 327,873. Patented Oct. 6, 1885.
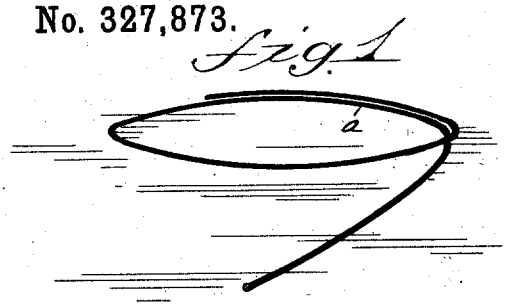
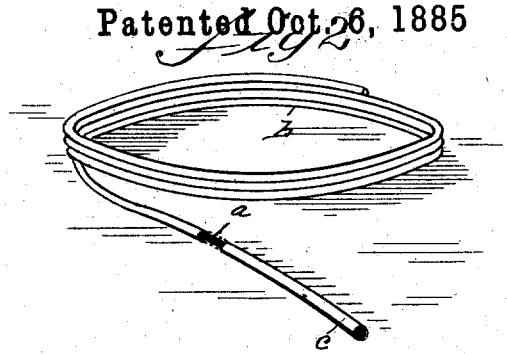
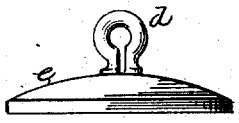
WITNESSES:
J. D. Garfield
E. S. Chapin
INVENTOR
Edward N. Foote
BY
Henry A. Chapin
ATTORNEY

UNITED STATES PATENT OFFICE.

EDWARD N. FOOTE, OF NORTHAMPTON, MASSACHUSETTS.

METALLIC-BUTTON SHANK.

SPECIFICATION forming part of Letters Patent No. 327,873, dated October 6, 1885.

Application filed February 5, 1885. Serial No. 154,996. (No model.)

*To all whom it may concern:*

Be it known that I, EDWARD N. FOOTE, a citizen of the United States, residing at Northampton, in the county of Hampshire and State of Massachusetts, have invented new and useful Improvements in Metallic-Button Shanks, of which the following is a specification.

This invention relates to improvements in metallic-button shanks, the object being to provide for metal buttons to which the shanks are secured by soldering a ready-made shank bearing upon its surface sufficient solder for uniting the shank to the button, and capable of being, under heat, caused to flow therefrom and become deposited around the foot of the shank upon the button, thereby obviating in the process of making said buttons the necessity of applying solder to each one before soldering on the shank, and insuring just the proper amount to produce good and uniform work.

In the drawings forming part of this specification, Fig. 3 illustrates in an enlarged view a metallic-button shank constructed according to my invention. Fig. 4 illustrates said shank standing on the back side of a button, but before heat is applied to solder it. Fig. 5 illustrates the shank and button of Fig. 4 after the shank is soldered on. Fig. 1 illustrates a coil of unprepared, and Fig. 2 of prepared, button-shank wire.

In the drawings, $d$ is the shank, $e$ is the button, $a$ is the unprepared and $b$ the prepared shank-wire, and $c$ indicates the solder on the wire and on the shank, and after being deposited at the foot of the shank on the button.

Heretofore metallic-button shanks have been formed from copper, brass, or other suitable wire in substantially the shape shown in Fig. 3, and in applying them and soldering them to the back side of the button $e$ a mixture of solder and acid has been first deposited on the button. Next the shank was placed in said mixture, and then a blow-pipe flame was directed onto the solder mixture, thereby fusing it and uniting the shank and button. Said old method of soldering on shanks is productive of much imperfect work, owing to the varying quantity of solder which is in that way applied to the button, and more time is expended in doing the work in that way than by the improved method hereinafter set forth.

In carrying out my invention I use coiled wire of brass, copper, or other suitable metal, as $a$, applying to it any suitable flux, and submit it to a bath of melted solder, by drawing it through the latter, or in any other suitable way, whereby it becomes coated with solder. Said coated wire is then drawn through suitable dies to finish its surface and reduce it to a uniform diameter.

The coated wire is as nearly as practicable represented in Fig. 2, $c$ indicating the solder-coating, and $a$ the wire. In said figure the thickness of the solder-coating is somewhat exaggerated. In practice the thickness of the solder on the wire is so graduated that the quantity on a finished button-shank made therefrom will be sufficient only to secure the proper union of the shank to the button when heat is applied to the former, in which case very little, if any, solder is left on the shank after the soldering operation, but it is caused to be deposited at the junction of the shank and the button substantially as shown in Fig. 5, leaving the wire part of the shank about of its original diameter.

After the wire $a$ has been coated as aforesaid it is, by a suitable machine, made into button-shanks, substantially such as are shown in Figs. 3 and 4.

In employing said coated shanks the operator picks up a shank with a pair of pliers or similar tool, places it in its proper place on the button, and directing a blow-pipe flame onto the shank the solder thereon flows downward onto and unites with the button and foot of the shank, taking substantially the form shown in Fig. 5 at $c$.

Button-shanks made from uncoated wire may be coated with solder by afterward dipping them therein; but coating so applied is uneven and much less satisfactory than when applied to the wire as above set forth.

What I claim as my invention is—

1. As a new article of manufacture, a metallic-button shank consisting of a wire center coated with solder, substantially as set forth.

2. A solder-coated metallic-button shank, substantially as described, made from solder-covered wire, substantially as set forth.

EDWARD N. FOOTE.

Witnesses:
WILLIAM W. SEE,
C. H. PIERCE.